Oct. 20, 1964     L. N. ALLEN ETAL     3,153,310

HINGED ADJUSTABLE SUPPORT WHEEL FOR MOWERS

Filed June 18, 1963

INVENTORS
LEWIS N. ALLEN
LAWRENCE D. ALLEN
WILLIAM B. ROBINSON
BY

ATTORNEY

3,153,310
HINGED ADJUSTABLE SUPPORT WHEEL FOR MOWERS
Lewis N. Allen and Lawrence D. Allen, both of Rte. 6, Union City, Tenn., and William B. Robinson, P.O. Box 405, Union City, Tenn.
Filed June 18, 1963, Ser. No. 288,659
1 Claim. (Cl. 56—322)

This invention relates to improvements in tractor-mounted mowers.

More particularly, the invention resides in the provision of an adjustable hinged auxiliary support wheel for the outer end of a tractor-mounted reciprocating type mower, and the main object of the invention is to provide such an auxiliary wheel which will greatly increase the efficiency of operation of the mower on rough terrain or the like without materially increasing its cost.

A further object of the invention is to provide an adjustable hinged support wheel which is readily attachable to the outer end of the cutter bar of substantially any well-known make of reciprocating mower at the time of manufacturing of the mower or on existing mowers in the field.

Another important object of the invention is to provide a supporting wheel for the outer end of a tractor-mounted mower which is hinged to a vertically adjustable mounting plate for swinging movement on a vertical hinge axis located rearwardly of the cutter bar, enabling the wheel to swing approximately 180 degrees upon said axis.

Another object of the invention is to provide means of the mentioned character which will allow the mower to more readily traverse irregular ground or slopes and which will allow for side sway of the mower structure without causing the wheel to dig into the ground with resulting damage to the wheel and mounting plate and which will greatly eliminate the tendency for trash and hay to accumulate and hang up on the mower or supporting wheel structure, thereby making it unnecessary for the operator to continually climb on and off of the tractor for the time-wasting job of removing trash from the mower blade.

The invention allows adjusting of the outer end of the mower structure to the desired cutting height to keep the blade of the mower above rocks, stumps and the like, while at the same time providing a desirable degree of hinge motion for the wheel, during forward motion or backing up of the tractor and during turning of the tractor and mower.

Other objects and advantages of the invention will be apparent during the course of the following detailed description.

Figure 1:
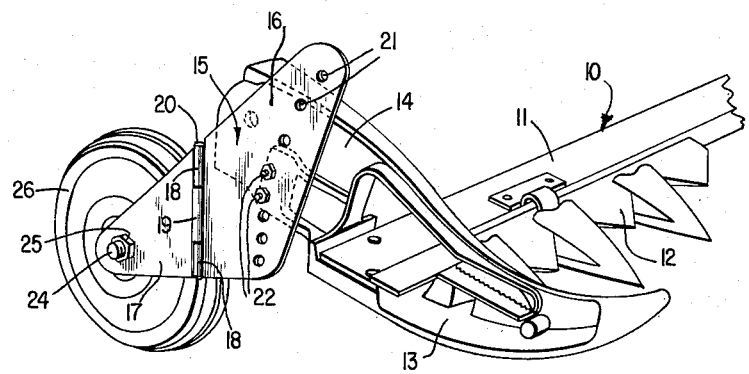
Figure 2:
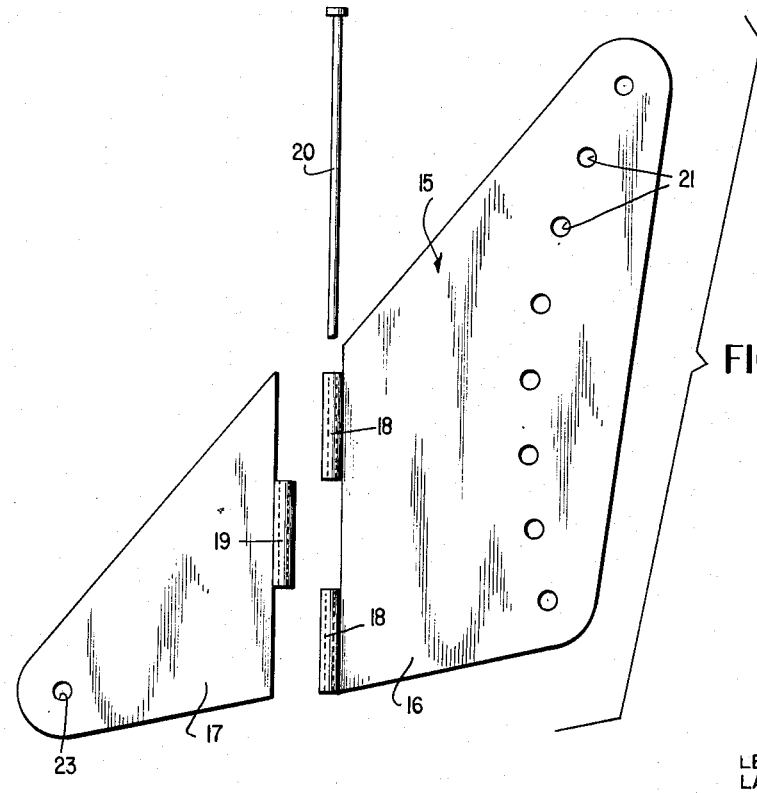

In the accompanying drawings forming a part of this application and in which like numerals are employed to designate like parts throughout the same, FIGURE 1 is a fragmentary perspective view of the outer end portion of a tractor-mounted mower having the wheel attachment embodying the invention, and FIGURE 2 is an enlarged exploded side elevational view of an adjustable hinged mounting plate forming a part of the invention.

In the drawings, wherein for the purpose of illustration is shown a preferred embodiment of the invention, the numeral 10 designates generally a reciprocating tractor mower of substantially conventional construction, having the usual transverse horizontal mower bar 11, carrying conventional reciprocating cutter blade means 12 driven in the usual manner. At its outer end, the mower bar 11 is equipped with a conventional shoe 13 having a rearwardly extending vertical plate extension 14 integral therewith and to which the invention is adapted to be attached. The opposite end of the mower bar, not shown, may also have a vertically adjustable shoe of conventional construction, not shown.

The invention proper comprises a generally triangular mounting plate 15, disposed vertically in use and having separately formed sections 16 and 17 carrying interfitting vertical axis hinge knuckles 18 and 19 on their meeting edges and suitably rigidly secured thereto by welding or the like. A suitable hinge pintle 20 is provided for engagement through the interfitting knuckles 18 and 19, FIGURE 1, to complete the hinge joint between the plate sections 16 and 17, thereby allowing approximately 180 degrees of relative swinging movement between the plate sections on the vertical axis of the hinge defined by the pintle 20.

The forward plate section 16 has a preferably arcuate row of generally vertically equidistantly spaced adjustment openings 21 formed therethrough, any adjacent pair of which may receive a pair of bolt means 22, utilized for rigidly securing the plate section 16 to the outer face of extension 14 at the desired vertically adjusted position, one such position being illustrated in FIGURE 1.

The trailing plate section 17 has an opening 23 formed therethrough near its rear extremity for the reception of conventional axle means 24, secured in place by a nut 25 bearing on one side of plate section 17. Rotatably mounted upon the axle means 24, preferably on a suitable frictionless-type bearing, is a sturdy rubber tired wheel 26. The wheel 26 may be mounted inwardly of the plate section 17, as shown in FIGURE 1, or outwardly thereof, if preferred.

In use, the reciprocating mower 10 is secured to the farm tractor, not shown, in a conventional manner and is drawn forwardly over the ground by the tractor. The hinged sectional mounting plate 15 is adjusted vertically to the desired elevation relative to the mower bar 11 by selection of the proper openings 21 and then rigidly secured in the selected adjusted position through the bolt means 22. The hinged wheel 26 on the outer end of the mower structure follows the contours of the ground and enables the mower to pass over rocks and other obstructions and to clear trash and the like while mowing at the desired elevation. The hinged wheel allows free turning of the mower during both forward and rearward movement with the tractor. Additionally, when the mower is operating along a slope, there is a tendency for side slipping or swaying of the mower structure and a resulting tendency for the outer end of the mower to dig into the ground and at this time, the hinged wheel 26 comes into play and allows easy operation under such conditions. If a rigid wheel structure were employed under these conditions, the wheel would tend to dig into the ground with great force which under some conditions would actually bend the mounting plate 15 or the axle structure or damage the wheel itself. All of this is overcome by means of the present invention. Furthermore, the provision of the hinged wheel for supporting the outer end of the mower bar greatly eliminates the tendency for trash or hay to hang up or gather on the mower structure, shoe or wheel supporting structure. The plate sections 16 and 17 are narrow in the direction of movement of the mower and do not tend to gather trash, weeds or the like. The wheel proper with the hinge plate section 17 may swing freely at all times upon the axis of the hinge pintle 20 to facilitate the smooth operation of the mower regardless of the terrain. The wheel 26 may swing approximately 90 degrees upon either side of the straight-away position shown in FIGURE 1 but may not swing a full 360 degrees in the manner of a conventional caster wheel, as this latter arrangement would be undesirable for the present application and would tend to cause instability of the mower.

In actual practice on existing equipment, the present construction has proven to be ideal and greatly improves the efficiency of operation of the mower by lessening the tendency of the same to collect trash and the like and by entirely eliminating the tendency for the outer end of the mower or the wheel to dig into the ground on rough terrain or on a slope. The advantages of the construction will be apparent to those skilled in the art without the necessity for a further description.

It is to be understood that the form of the invention herewith shown and described is to be taken as a preferred example of the same, and that various changes in the shape, size and arrangement of parts may be resorted to, without departing from the spirit of the invention or scope of the subjoined claim.

Having thus described our invention, we claim:

An auxiliary support wheel attachment for reciprocating mowers of the type commonly drawn by a tractor, said support wheel attachment adapted to support and stabilize the outer end of the mower, the outer end of the mower including a rearwardly projecting substantially vertical plate extension, said support wheel attachment comprising a forward substantially vertical relatively thin flat plate lying upon the outer side of said plate extension and being upwardly tapering and extending above and below the plate extension, said plate having a generally vertically extending arcuate row of adjusting openings formed therethrough, at least a pair of bolts carried by said extension and engageable through any selected adjacent pair of openings in said row for adjusting the plate vertically on the extension and for also adjusting somewhat the angle of the plate upon the extension, said plate having a rear substantially vertical edge, vertical hinge knuckles carried by said edge, a companion rear substantially vertical relatively thin flat plate immediately rearwardly of said edge and having a forward substantially vertical edge and tapering rearwardly and downwardly to form with the forward plate a generally triangular body portion, a substantially vertical hinge knuckle on the forward edge of the rear plate interfitting with said hinge knuckles of the forward plate, a pintle engaging through all of said knuckles to form therewith a substantially vertical hinge joint between the forward and rear plates, whereby the rear plate may swing freely substantially 180 degrees about the axis of the hinge joint, substantially horizontal short axle means secured to the rear end of the rear plate, and a low friction type rubber tired ground wheel journaled for rotation upon the axle means and disposed inwardly of said plate.

References Cited by the Examiner

UNITED STATES PATENTS

| 126,932 | 5/72 | Crawford | 56—322 |
| 252,495 | 1/82 | Miller | 56—322 |
| 269,232 | 12/82 | Pridmore | 56—322 |

T. GRAHAM CRAVER, *Primary Examiner.*

RUSSELL R. KINSEY, *Examiner.*